3,480,673
POLYHALODIPHENYL MONOAMINES
Eric Smith, New Haven, Conn., assignor to Olin Mathieson Chemical Corporation, a corporation of Virginia
No Drawing. Filed June 1, 1964, Ser. No. 371,785
Int. Cl. C07c 87/60, 119/04; A01n 9/20
U.S. Cl. 260—578                                    3 Claims

ABSTRACT OF THE DISCLOSURE

Halogenated polyphenyl compounds are reacted with a nitrogen-containing compound of the formula $R_2NH$, such as ammonia, in the presence of a metal halide to form halogenated diphenyl polyamines, which are reacted with phosgene to yield the corresponding halogenated diphenyl polyisocyanates. The halogenated polyphenylene amines are useful as pesticides and the halogenated diphenyl polyisocyanates are useful as a reactant in the preparation of polyurethane foams.

---

This invention relates to halogenated polyphenylene amines and isocyanates and to a novel process for preparing them.

It is known that flame retardance is imparted to polyurethane foams when chlorine is chemically combined in the polyol moiety of the polyurethane polymer. Since most highly chlorinated polyols are relatively expensive, the cost of the resulting polyurethane foam is generally excessive. Therefore there is a need in the industry for lower cost chlorinated polyurethane foams.

Chlorinated carbamates are also useful as herbicides, pesticides, fungicides, and the like. There is a need in the industry at the present time for lower cost chlorinated carbamates.

Halogenated polyphenyl compounds are commercially available at relatively low prices. Because these compounds are generally chemically inert, little or no success has been obtained previously in efforts to prepare derivatives of these compounds which may be suitable for use as herbicides, pesticides, or fungicides, or in the preparation of intermediates suitable for use in the preparation of polyurethane foams and other polymeric materials.

It is a primary object of this invention to provide novel halogenated polyphenylene amines.

A further object of this invention is to provide novel halogenated polyphenylene isocyanates.

Still another object of the invention is to provide novel halogenated polyurethane compounds which are self-extinguishing when exposed to a flame.

Another object of the invention is to provide a novel process for preparing halogenated polyphenylene amines.

It is another object of the invention to provide an improved method of preparing halogenated polyphenylene isocyanates.

These and other objects of the invention will be apparent from the following detailed description thereof.

It has now been discovered that the foregoing objects are accomplished by reacting a halogenated polyphenyl with a compound of the formula $R_2NH$, where R is hydrogen, alkane containing between 1 and about 10 carbon atoms, alkene containing between 1 and about 10 carbon atoms, cycloaliphatic containing between about 5 and about 10 carbon atoms, aromatic containing between about 6 and about 16 carbon atoms, and mixtures thereof, in the presence of a catalytic proportion of a metal halide catalyst under anhydrous conditions and recovering the resulting halogenated polyphenylene amine. Phosgenation of the resulting halogenated polyphenylene amine in the presence of an inert solvent yields the corresponding halogenated polyphenylene isocyanate. Halogenated polyphenylene diisocyanates, prepared in this manner are suitable for use as a reactant in the preparation of polyurethane compounds which are self-extinguishing when contacted with a flame.

Halogenated polyphenyl compounds suitable for use as a reactant in the novel process of this invention are represented by the following formula:

(I) 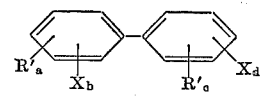

where X is a halogen selected from the group consisting of chlorine and bromine, where R′ is selected from the group consisting of hydrogen, hydroxyl, alkyl containing between about 1 and about 10 carbon atoms, and mixtures thereof, where $a$ and $c$ are each a number between 0 and 4, and where $b$ and $d$ are each a number between 1 and about 5, and preferably between about 4 and about 5.

Typical examples of suitable halogenated polyphenyl reactants include di-, tri-, tetra-, penta-, hexa-, hepta-, octa-, nona-, and decahlorodiphenyl, the corresponding bromine substituted diphenyls, and mixtures thereof. However, other polyphenyl compounds which are substituted with at least on chlorine or bromine atom per phenyl radical may also be employed. Typical examples of other halogenated polyphenyl compounds include hexachlorotriphenyl, tetradecachlorotriphenyl, decachloropentaphenyl and docosachloropentaphenyl, the corresponding bromine compounds and mixtures thereof.

Typical examples of suitable nitrogen containing compounds represented by the formula $R_2NH$ useful as a reactant in the instant novel process include liquid ammonia, primary amines such as methylamine, ethylamine, n-propylamine, isopropylamine, n-butylamine, isobutylamine, secondary butylamines, isoamylamine, 2-aminopentane, n-hexylamine, n-oxtylamine, aniline, and mixtures thereof.

Other suitable nitrogen compounds include secondary amines such as dimethylamine, diethylamine, di-n-propylamine, diisopropylamine, di-n-butylamine, diisobutylamine, di-sec-butylamine, methylethylamine, piperidine, morpholine and the like.

An excess of the nitrogen compound above the stoichiometric proportion required to complete the reaction with the halogenated polyphenyl compound to form the desired corresponding halogenated polyphenylene amine is employed. The nitrogen compound generally acts as a solvent for the amine product and, therefore, sufficient nitrogen compound should be present in the reaction mass to completely dissolve the amine product as it forms. Generally proportions in the range between about 25 and 75 times the stoichiometric proportion are employed, but any excess that can be processed economically may be employed.

The reaction between the nitrogen compound and diphenyl compound is carried out in the presence of a catalytic proportion of a metal halide. Any halide of a metal selected from the group consisting of copper, iron, zinc, tin and nickel may be used as a catalyst in the form of chloride or bromide of the metal. Typical examples of suitable metallic halides include cuprous chloride, ferric chloride, zinc chloride, stannous chloride, nickel chloride, mixtures thereof and the like. Generally, the catalyst is employed in a proportion equivalent to about 0.25 and about 5 percent by weight of the halogenated polyphenyl reactant, but greater or lesser proportions may be employed if desired.

The reaction between the nitrogen compound and diphenyl compound is carried out at a temperature in the range between about 150° and about 400° C., and preferably in the range between about 175° and about 350° C. The reaction pressure is not critical and autogeneous pressure is suitable. The time necessary to complete the reaction generally is in the range between about 1 and about 12 hours, and preferably between about 2 and about 6 hours.

When a lower temperature and a shorter reaction period in the above mentioned ranges are employed, the resulting halogenated polyphenylene amine is predominately the monoamine. Similarly, a higher temperature and a longer reaction period in the above mentioned ranges yields a product which is predominantly the triamine and tetraamine. Intermediate conditions favor the formation of the diamine. It will be recognized by those skilled in the art that the product will be a mixture of amines, the complexity of the mixture depending upon the number of halogen atoms in the initial diphenyl compounds and upon the reaction conditions employed.

In this reaction at least one halogen atom in the halogenated diphenyl combines with hydrogen in the nitrogen compound to yield hydrogen chloride, the remainder of the nitrogen compound being substituted for the chloride atom in the phenyl group.

The residue obtained after reacting the halogenated diphenyl with the nitrogen compound is dried, stirred in concentrated sulfuric acid, and the resulting slurry is filtered to separate unreacted solid products. The clarified filtrate is then admixed with water, which effects precipitation of the corresponding halogenated polyphenylene amine.

The solid product thus prepared may then be further purified by washing and drying by conventional techniques.

Halogenated diphenylene amines prepared in accordance with this invention are represented by the following formula:

(II) 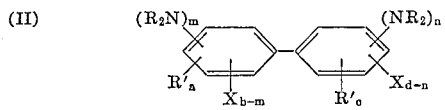

where R, R', X, a, b, c and d, have the meaning referred to above, where $m$ is a number having a value in the range betwen about one and about two and $n$ is a number having a value in the range between about zero and about two.

Preferred halogenated diphenylene amines are represented by the following formula:

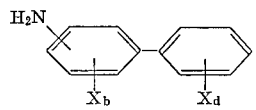

where $b$ is 3, where $d$ is in the range from 4 to 5, and where X is a halogen selected from the group consisting of chlorine and bromine.

When the halogenated polyphenyl compound contains three or more phenyl groups, for example up to about five phenyl groups, the formula for the resulting halogenated polyphenyl amine will deviate from Formula II in accordance with the structure of the starting polyphenyl compound.

The resulting halogenated polyphenylene amines are particularly useful as herbicides, pesticides, fungicides and the like. These amines are relatively inexpensive because of the comparative low cost of the halogenated polyphenyl reactants.

Halogenated polyphenylene primary amines which are obtained when the nitrogen containing compound used in the process of this invention is liquid ammonia, can also be reacted with phosgene to yield the corresponding isocyanate. Preferably, particles of the halogenated polyphenylene primary amine are suspended in an inert suspending medium prior to reaction, but if desired, the particles may be melted by heating, and the phosgene is then reacted with the resulting melt.

Inert suspending media suitable for use in preparing the novel isocyanates of this invention include the chlorinated aromatic hydrocarbons such as chlorobenzene, o-dichlorobenzene, higher boiling hydrocarbons such as toluene, xylene and the like, and chlorinated aliphatic hydrocarbons such as tetrachloroethane.

Sufficient phosgene is reacted with the amine to convert a major portion thereof to the corresponding isocyanate. The reaction temperature is in the range between about 0° and about 200° C., and preferably in the range between about 150° and about 185° C. The time required for the reaction is usually between about 1 and about 5 hours, but longer periods could be employed, provided extensive oligomerization does not occur, the longer reaction periods resulting in higher yields of the isocyanate. After phosgenation is completed, the system is purged of phosgene with nitrogen. The solvent is then removed by distillation to yield a halogenated polyphenylene isocyanate. Halogenated polyphenylene polyisocyanates, preferably the diisocyanates, are suitable for use in the preparation of a polyurethane foam by reacting with a polyol or polyether polyol in the presence of a catalyst and a foaming agent. The resulting polyurethane foams have a high degree of flame retardance and thermal stability. In addition, these polyisocyanates have a plasticizing effect when used as a reactant in the preparation of film or foam polymers.

The following examples are presented to define the invention more fully without any intention of being limited thereby. All parts and percentages are by weight unless otherwise specified.

EXAMPLE I

A chlorinated diphenyl which was a mixture of octachlorodiphenyl and nonachlorodiphenyl containing about 68% chlorine (100 grams) was charged along with 350 milliliters of liquid ammonia at −60° C. and cuprous chloride (1 gram) to a stainless steel rocking autoclave (volume of 845 milliliters). The autoclave was sealed and rocked at 200° C. for 3 hours, then cooled and vented. The residue was allowed to dry, then stirred with concentrated sulfuric acid (600 ml.) for 2 hours. The solution was filtered through a coarse and then a fine sintered glass funnel, and the insoluble matter was washed with water and dried (12.0 grams). The filtrate was poured into water (3 liters), giving pink crystals (81.0 grams) which were washed with water and dried in high vacuum at room temperature. The product was taken up in chloroform and shaken with an excess of saturated sodium bicarbonate solution, then with water. The solution was dried with anhydrous calcium sulfate and then vacuum evaporated to dryness, giving light brown crystals which softened at 90–120° and melted at 120°–145° C.

The infrared spectrum of the product in Nujol (a high boiling paraffin) showed absorptions at 2.85, 2.95; 6.2 (strong); 7.85; 9.05 (strong); 11.3; 13.15; 13.6; and 14.4 microns, indicating a chlorinated aromatic primary amine. The product was diazotized in 90 percent sulfuric acid and on coupling with beta-naphthol in aqueous sodium hydroxide gave an orange-brown precipitate, confirming the presence of a primary amine.

Microanalysis of the product was as follows—Found: C, 32.08; H, <1%; N, 3.91, 4.08; Cl, 59.8, 60.2%. Molecular weight: 453 (osmometer, benzene). Since the starting material was derived from chlorinated diphenyl, the latter analysis suggested and an empirical formula of

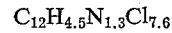

which corresponds to a compound predominating in hepta- and octachlorodiphenylene monoamine.

The uncorrected yield of product, based on the microanalysis, was 85% (88% conversion of the chlorinated diphenyl).

For purposes of comparison, a similar procedure was employed except that aqueous ammonia was employed as the nitrogen compound. The product was predominately chlorinated amine, and the yield of chlorinated diphenyl amine was only about 2%. The product was dark brown and insoluble in common solvents.

EXAMPLE II

A procedure similar to Example I was repeated with the exception that the reaction was carried out at 250° C. for 6 hours. The weakly basic product was a salmon-colored powder, having an average empirical composition which corresponded to $C_{12}H_{7.4}Cl_{6.3}N_{2.4}$ (approximately hexachlorodiphenylene diamine, and containing some heptachlorodiphenylene diamine). Vapor fractometry indicated that 2 major and 3 minor components were present. The conversion of chlorinated diphenyl was 95% and the uncorrected yield was about 80%.

EXAMPLE III

The product of Example II (25 grams) was suspended in ortho-dichlorobenzene (50 grams) and phosgene was passed in the slurry at 10° C. for one hour, 80° C. for one hour, 120° C. for one hour, and at reflux at 180° C. for 4 hours. Phosgene was removed from the solution by passing nitrogen through the system at reflux, and the ortho-dichlorobenzene was removed by distillation at 10 mm. pressure. The residue showed a strong absorption in the infrared spectrum at 4.5 microns, indicating the presence of an isocyanate.

Elemental analyses and isocyanate assay gave the following results.—Found: C, 38.13, 37.92; H, 0.86, 0.94; N, 6.20; Cl, 48.1, 47.9; NCO, 17.60, 17.79, 17.81%. This corresponds to an average empirical composition of $$C_{14.4}H_{4.1}Cl_{6.15}N_{2.0}(NCO_{1.93})$$

and indicates almost complete conversion of the amino groups into isocyanate groups. This product predominates in hexachlorodiphenylene diisocyanate.

Having thus described the invention what is desired to be secured by Letters Patent is:

1. A compound having the formula:

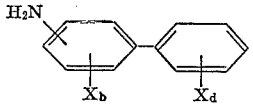

where X is a halogen selected from the group consisting of chlorine and bromine, where $b$ is 3 and where $d$ is in the range from 4 to 5.

2. Heptachlorodiphenylene monoamine.
3. Octachlorodiphenylene monoamine.

References Cited

UNITED STATES PATENTS

| | | | |
|---|---|---|---|
| 1,935,515 | 11/1933 | Mills | 260—581 XR |
| 2,084,033 | 6/1937 | Jenkins | 260—578 XR |
| 2,126,009 | 8/1938 | Harris | 260—578 XR |
| 2,829,164 | 4/1958 | Rocklin | 260—581 XR |
| 3,308,158 | 3/1967 | Szobel et al. | 260—570.5 |

OTHER REFERENCES

Case: J. Amer. Chem. Soc., vol. 61, pp. 3487–9 (1939).

CHARLES B. PARKER, Primary Examiner

D. H. TORRENCE, Assistant Examiner

U.S. Cl. X.R.

260—2.5, 77.5, 453, 247, 293, 471, 571, 576, 581, 649, 999, 620